(12) United States Patent
Huang et al.

(10) Patent No.: US 7,744,952 B2
(45) Date of Patent: Jun. 29, 2010

(54) METHOD FOR FORMING COATING MATERIAL AND THE MATERIAL FORMED THEREBY

(75) Inventors: Yuan-Chang Huang, Keelung (TW);
Yuung-Ching Sheen, Hsinchu (TW);
Yih-Her Chang, Hsinchu (TW);
Kuo-Feng Lo, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 655 days.

(21) Appl. No.: 11/318,459

(22) Filed: Dec. 28, 2005

(65) Prior Publication Data

US 2006/0147829 A1    Jul. 6, 2006

(30) Foreign Application Priority Data

Dec. 30, 2004    (GB) .................................. 0428546.6

(51) Int. Cl.
*B05D 3/00* (2006.01)
(52) U.S. Cl. .................... 427/180; 427/189; 427/385.5; 427/387
(58) Field of Classification Search ........................ None
See application file for complete search history.

(56) References Cited

U.S. PATENT DOCUMENTS

| | | | |
|---|---|---|---|
| 6,183,658 B1 | 2/2001 | Lesniak et al. | |
| 6,287,639 B1 | 9/2001 | Schmidt et al. | |
| 6,323,268 B1 | 11/2001 | Fisher et al. | |
| 6,335,037 B1 | 1/2002 | Ichinohe et al. | |
| 6,455,103 B1* | 9/2002 | Mennig et al. | 427/165 |
| 6,534,176 B2* | 3/2003 | Terase et al. | 428/403 |
| 6,800,354 B2 | 10/2004 | Baumann et al. | |
| 6,858,284 B2* | 2/2005 | Nun et al. | 428/149 |
| 6,997,018 B2* | 2/2006 | Sakoske et al. | 65/60.2 |
| 2002/0016433 A1 | 2/2002 | Keller et al. | |
| 2004/0014865 A1 | 1/2004 | Keller et al. | |
| 2004/0026832 A1 | 2/2004 | Gier et al. | |
| 2004/0137221 A1* | 7/2004 | Zeira et al. | 428/333 |
| 2005/0191491 A1* | 9/2005 | Wang et al. | 428/407 |
| 2006/0110540 A1* | 5/2006 | Sahouani | 427/372.2 |

FOREIGN PATENT DOCUMENTS

| | | |
|---|---|---|
| CN | 1594454 | 3/2005 |
| EP | 1 479 738 A1 | 11/2004 |
| JP | 2005-41934 A | 2/2005 |

* cited by examiner

*Primary Examiner*—Erma Cameron
(74) *Attorney, Agent, or Firm*—Birch, Stewart, Kolasch & Birch, LLP

(57) ABSTRACT

A method for forming a coating material capable of forming a hydrophobic, microstructured surface. The method comprises treating micro or nano-particles particles with a hydrophobic agent and an additive to form larger particles with the hydrophobic agent bonded thereto. The invention also comprises the coating material thus formed.

19 Claims, 2 Drawing Sheets

METHOD FOR FORMING COATING MATERIAL AND THE MATERIAL FORMED THEREBY

CROSS-REFERENCE TO RELATED APPLICATIONS

The subject matter of this application relates to that of copending application Ser. No. 11/318,566, filed on Dec. 28, 2005, for "Method for forming self-cleaning coating comprising hydrophobically-modified particles", both of which are assigned to a common assignee with this application. The disclosure of the co-pending application is incorporated herein by reference.

BACKGROUND

The present invention relates in general to coating technology. More particularly, it relates to a method for forming a material capable of forming a microstructured surface on an object and the material formed thereby.

The wettability of solid surfaces is a very important property, and is governed by both the chemical composition and geometrical microstructure of the surface. Currently, hydrophobic surfaces with water contact angle higher than 130° are arousing much interest because they will bring great convenience in daily life as well as in many industrial processes. Various phenomena, such as sticking snow, contamination or oxidation, are expected to be inhibited on such a surface.

An important application for these hydrophobic surfaces is making self-cleaning coatings based on their water and dirt repellency. These self-cleaning coatings not only provide value-added products with a high potential to save on cleaning and other maintenance cost, but also are good for the ecobalance of the coated product, since cleaning chemicals no longer pollute the water and since energy is saved by reducing or eliminating maintenance cycles.

Conventionally, super-hydrophobic surfaces have been produced mainly in two ways. One is to create a rough structure on a hydrophobic surface, and the other is to modify a rough surface by materials with low surface free energy. Up to now, many methods have been developed to produce rough surfaces, including solidification of melted alkylketene dimer, plasma polymerization/etching of polypropylene in the presence of polytetrafluoroethylene, microwave plasma-enhanced chemical vapor deposition of trimethylmethoxysilane, anodic oxidization of aluminum, immersion of porous alumina gel films in boiling water, mixing of a sublimation material with silica or boehmite, phase separation, and embossing. To obtain super-hydrophobic surfaces, coating with low surface energy materials such as fluoroalkylsilane is often necessary.

The invention is generally directed to a novel method for making coating materials capable of forming a hydrophobic, microstructured surface, which may be used to make self-cleaning coatings.

SUMMARY

In a first aspect, the invention provides a method for forming a coating material capable of forming a microstructured surface. An exemplary method comprises providing micro or nano-particles; and treating the particles with a hydrophobic agent and an additive to form larger particles with the hydrophobic agent bonded thereto. In the above, the step of treating the particles with the hydrophobic agent may take place either before or after, or simultaneously with the step of treating the same with the additive.

In a second aspect, the invention provides a coating material made by the method according to the first aspect of the invention.

DESCRIPTION OF THE DRAWINGS

For a better understanding of the present invention, reference is made to a detailed description to be read in conjunction with the accompanying drawings, in which.

DETAILED DESCRIPTION

Figure 1:
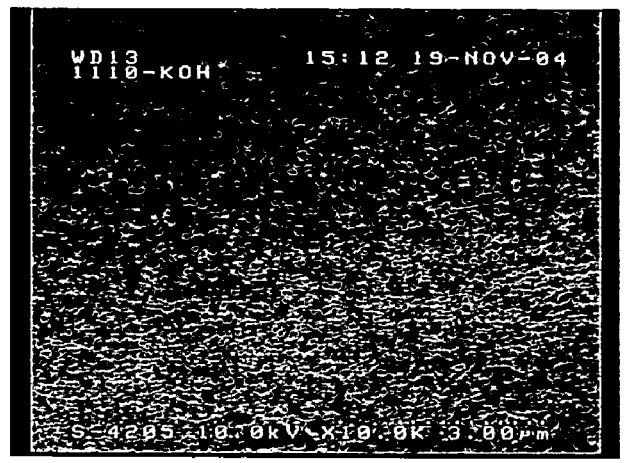
FIGS. 1 to 3 are scanning electron microscope images (magnification ×10,000) of the coatings of Examples 1 to 3, respectively.

The method for making coating materials will be described here in greater detail. Some embodiments of the invention may provide a hydrophobic coating with water contact angle higher than 130°. This is accomplished by incorporating an additive to promote aggregation of particles to physically enhance the surface hydrophobicity. Other objects and advantages of the invention will become apparent from the following description.

In the invention, micro-particles with sizes varying from about 0.1 to 100 μm or nano-particles with sizes varying from about 1 nm to 100 nm may be used as starting materials for forming the coating material. Preferably, particles with a diameter of about 1-1000 nm are used. These particles are preferably wet synthesis process particles prepared from precursors. Any known wet synthesis processes such as sol gel, hydrothermal, or precipitation may be used. For example, the precursor includes water, solvent, and metal alkoxide. Examples of the metal alkoxide include tetramethoxysilane (TMOS), tetraethoxysilane (TEOS), titanium tetraisopropoxide, titanium tetramethoxide, titanium tetraethoxide, titanium tetrabutoxide and zirconium n-butoxide. The solvent may comprise an alcohol such as methanol, ethanol, isopropanol, or butanol. Other solvents, however, such as hexane, toluene, ketone, or diethyl ether may be used. The precursors may be refluxed for an extended period, such as a period of above 5 minutes, preferably from 0.5 to 24 hours to yield the desired particles. For example, silicate gels may be prepared by hydrolyzing an alkoxide dissolved in an alcohol with a mineral acid or base, or organic acid or base.

It is to be understood that many types or grades of commercially available silica particles and colloidal silica may be used for the invention. Those skilled in the art will also recognize that although silica particles are preferred, any particles with —SiR, —TiR, —ZrR or —AlR groups, wherein R is OH, COOH, $NH_2$, $CONH_2$, NCO, vinyl, SH or epoxy for proceeding condensation reactions may be used for the present invention.

In accordance with the invention, a hydrophobic agent and an additive are employed to chemically modify the aforementioned particles. The surfaces of the particles are modified by the hydrophobic agent to enhance the chemical hydrophobicity. The additive promotes hydrolysis and condensation reactions of the particles such that the particles grow into larger entities, which increases the hydrophobicity by providing surface roughness.

Hydrophobic agents conventionally used in the art may be used herein for enhancing the chemical hydrophobicity of the particle surfaces. The frequently used hydrophobic agents include Si-based hydrophobic agents such as siloxane, silane, or silicone; F-based hydrophobic agents such as fluorosilanes, fluoroalkyl silanes (FAS), polytetrafluoroethylene (PTFE), polytrifluoroethylene, polyvinylfluoride, or functional fluoroalkyl compounds; and hydrocabon hydrophobic agents such as reactive wax, polyethylene, polypropylene. A particularly preferred hydrophobic agent is polydimethylsiloxane (PDMS), a polymer with hydroxyl groups terminating the ends of each chain.

The additives used in the invention include mineral bases and organic bases. Representative examples include hydroxides such as alkali metal hydroxide and ammonium hydroxide; alkoxysilanes such as triakoxysilanes; and amines. Micro or nano-particles grow into larger cluster under treatment of these additives. It is believed that the additive promotes hydrolysis and condensation reactions of these particles. The additives used herein also include those comprising a reactive group which may form chemical bonds with the particles after the treatment. For example, the additives may be alkoxysilanes having vinyl, amino, epoxy, carboxyl, hydroxyl, amide, sulfide, or isocyanate groups. An illustrative additive in this case is (3-aminopropyl)triethoxysilane (APS).

The steps of treating the particles with the hydrophobic agent and the additive may take place ex-situ in an arbitrary order, or in-situ and simultaneously in one pot. For example, after forming particles from wet synthesis process precursors, the hydrophobic agent and the additive are directly mixed and reacted at a temperature between 0-100° C. for minutes or hours, preferably 1-48 hours. The pH value of the reaction is preferably controlled at about 6.5-14, more preferably about 9-13 for increasing surface roughness. As a result, larger particles with the hydrophobic agent bonded thereto can be obtained. The larger particles made by the invention typically have a size varying from about 100 nm to about 1000 μm. Preferably, the coating material may be prepared by reactions of 1-40 wt % of the particles, 0.3-10 wt % of the hydrophobic agent, 0.1-15 wt % of the additive, and residual amounts of solvent, based on the total weight of the coating material.

The coating material may be applied to a substrate by any known technique of forming a coating from a liquid, such as spin coating, dip coating, spray coating, brush coating, or roller coating. The coating may be dried at a temperature between room temperature and 200° C. over a period of 1 minute to 48 hours. Note that the drying temperature and time may vary depending on the type of particles, melting point of the substrate, curing condition of used chemicals and thickness of the coating.

The coatings formed from the material of the invention have a hydrophobic, microstructured surface. In preferred embodiments, the hydrophobic coatings may exhibit a water contact angle of above 150° and therefore can be used to produce self-cleaning coatings. Other possible applications include providing anti-corrosive or anti-icing coatings for buildings, vehicles, and other structures. Surfaces which can be treated with the hydrophobic coating include glass, plastic, metal, ceramic, polymer, but can also include other materials or composites.

Without intending to limit it in any manner, the present invention will be further illustrated by the following examples.

Example 1

4 g of TEOS, 1.5 g of 2-amino-2-methyl-1-propanol (AMP-95), 20 g of ethanol, and 1.1 g of water were mixed and reacted at room temperature for one hour. Thereafter, 0.8 g of PDMS and 0.32 g, of 0.1N KOH were added to the reaction mixture and reacted at room temperature for 48 hours with the pH value controlled at about 11.5-12. The resulting material was applied to a polyvinyl chloride (PVC) substrate with a facade paint thereon by dip coating, and dried at 50° C. for 24 hours.

The dried coating was inspected using a scanning electron microscope (SEM, Hitachi S-4200) with a tilt angle of 20°. Referring to FIG. 1, the SEM image (magnification ×10,000) shows that the coating had a microstructured, rough surface. The hydrophobicity of the coating was measured by a commercial contact angle meter (FACE model, Kyowa Interface Science) using 25 μl of water. The result is listed in Table 1.

Example 2

The same procedure as described in Example 1 was repeated except that KOH was replaced by NH$_4$OH.

Figure 2:
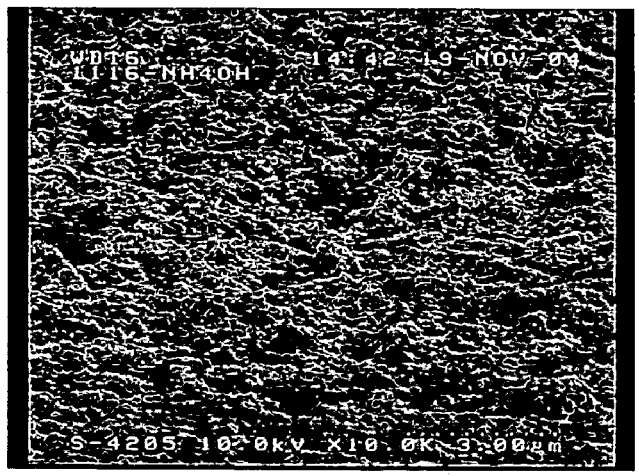

The dried coating was inspected using a scanning electron microscope (SEM, Hitachi S-4200) with a tilt angle of 200. The SEM image (magnification ×10,000) of FIG. 2 indicates that a rougher surface than that of Example 0.1 was obtained. The hydrophobicity of the coating was measured and listed in Table 1.

Example 3

The same procedure as described in Example 1 was repeated except that KOH was replaced by APS.

Figure 3:
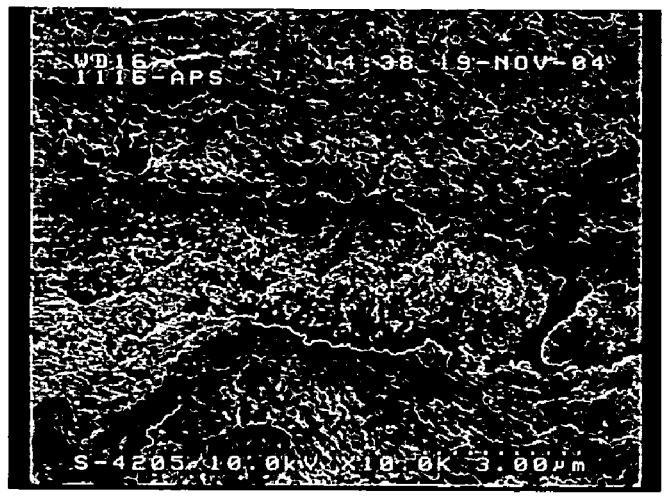

The dried coating was inspected using a scanning electron microscope (SEM, Hitachi S-4200) with a tilt angle of 20°. The SEM image (magnification ×10,000) of FIG. 3 indicates that an even rougher surface than that of Example 2 was obtained. The hydrophobicity of the coating was measured and listed in Table 1.

Example 4

4 g of commercial silica particle 1630S (Chang Chun PetroChemical, solid content 30%, particle size 16 nm), 1.5 g of 2-amino-2-methyl-1-propanol (AMP-95), 21 g of ethanol, and 1.1 g of water were mixed and reacted at room temperature for 20 minutes. Thereafter, 0.75 g of PDMS and 0.75 g of APS were added to the reaction mixture and reacted at room temperature for 4 days with the pH value controlled at about 11.5-12.

The resulting coating material was applied to a polyvinyl chloride (PVC) substrate with a facade paint thereon by dip coating, and dried at 50° C. for 24 hours. The hydrophobicity of the coating was measured and listed in Table 1.

Comparative Example 1

The same procedure as described in Example 1 was repeated except that KOH and PDMS were not added.

Figure 4:
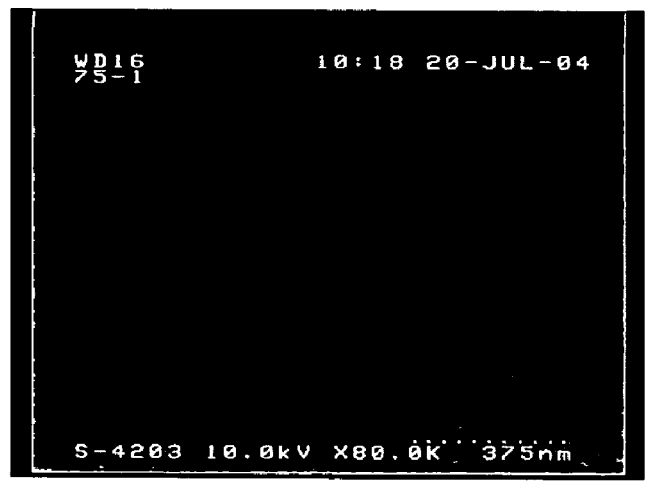
FIG. 4 is a scanning electron microscope image (magnification ×80,000) of the coating of Comparative Example 1.

The dried coating was inspected using a scanning electron microscope (SEM, Hitachi S-4200) with a tilt angle of 200. The SEM image (magnification ×80,000) of FIG. 4 indicates that no surface microstructure was observed. The hydrophobicity of the coating was measured and listed in Table 1.

Comparative Example 2

The same procedure as described in Example 1 was repeated except that KOH was not added. The hydrophobicity of the coating was measured and listed in Table 1.

Comparative Example 3

The same procedure as described in Example 1 was repeated except that PDMS was not added. The hydrophobicity of the coating was measured and listed in Table 1.

TABLE 1

|  | Water contact angle |
|---|---|
| Example 1 | 130° |
| Example 2 | >155° |
| Example 3 | >155° |
| Example 4 | 141° |
| Comparative example 1 | <40° |
| Comparative example 2 | 117° |
| Comparative example 3 | 65° |

As can be seen from Table 1, the coatings formed from the coating materials of the invention showed improved hydrophobicity as compared to that of Comparative Examples.

Comparative Example 4

The same procedure as described in Example 1 was repeated except that APS was not added and TEOS was replaced by 1.2 g of commercial micro-scale silica particles (Lo-vel-2023 from Chia-Fa Trade Inc., particle size: 10-15 µm). The water contact angle of the resulting coating was 1200.

This result indicates that in absence of the additive, the hydrophobicity was not satisfactory even when a larger particle has been employed as starting material.

While the invention has been described by way of example and in terms of preferred embodiment, it is to be understood that the invention is not limited thereto, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of forming a coating material capable of forming a microstructured surface, comprising:
   providing micro or nano-particles; and
   treating the micro or nano-particles with a hydrophobic agent and an additive to form larger particles with the hydrophobic agent bonded thereto, wherein the additive promotes hydrolysis and condensation reactions of the micro or nano-particles such that the micro or nano-particles grow into the larger particles and wherein step of treating the micro or nano-particles with the additive and the hydrophobic agent is effected at a pH of about 6.5-14.

2. The method as claimed in claim 1, wherein the providing of the micro or nano-particles comprises:
   providing wet synthesis process precursors;
   reacting the wet synthesis process precursors to form the micro or nano-particles.

3. The method as claimed in claim 2, wherein the wet synthesis process precursors comprise water, solvent, and metal alkoxide.

4. The method as claimed in claim 3, wherein the metal alkoxide is selected from the group consisting of tetramethoxysilane, tetraethoxysilane, titanium tetraisopropoxide, titanium tetramethoxide, titanium tetraethoxide, titanium tetrabutoxide and zirconium n-butoxide.

5. The method as claimed in claim 1, wherein the micro or nano-particles are particles having —SiR, —TiR, —ZrR or —AlR groups, wherein R is OH, COGH, $NH_2$, $CONH_2$, NCO, SH, vinyl, or epoxy.

6. The method as claimed in claim 5, wherein the particles are commercially available silica particles.

7. The method as claimed in claim 1, wherein the micro or nano-particles have diameters between about 1 nm-100 µm.

8. The method as claimed in claim 1, wherein the larger particles have a size between about 100 nm-1000 µm.

9. The method as claimed in claim 1, wherein the additive is selected from the group consisting of hydroxides, alkoxysilanes, and amines.

10. The method as claimed in claim 9, wherein the additive is selected from the group consisting of alkali metal hydroxides, ammonium hydroxide, and trialkoxysilanes.

11. The method as claimed in claim 1, wherein the hydrophobic agent comprises a Si-based hydrophobic agent.

12. The method as claimed in claim 11, wherein the Si-based hydrophobic agent comprises siloxane, silane, or silicone.

13. The method as claimed in claim 1, wherein the hydrophobic agent comprises a F-based hydrophobic agent.

14. The method as claimed in claim 13, wherein the F-based hydrophobic agent is selected from the group consisting of fluorosilanes, fluoroalkyl silanes, polytetrafluoroethylene, polytrifluoroethylene, polyvinylfluoride, and functional fluoroalkyl compounds.

15. The method as claimed in claim 1, wherein the hydrophobic agent comprises hydrocarbon compounds.

16. The method as claimed in claim 15, wherein the hydrophobic agent comprises reactive wax, polyethylene, or polypropylene.

17. The method as claimed in claim 1, wherein the additive is alkali metal hydroxide.

18. The method as claimed in claim 1, wherein the additive is ammonium hydroxide.

19. The method as claimed in claim 1, wherein the additive is trialkoxysilane.

* * * * *